Aug. 23, 1955  R. J. CEPON ET AL  2,716,207
ELECTRICAL APPARATUS
Filed Oct. 6, 1951
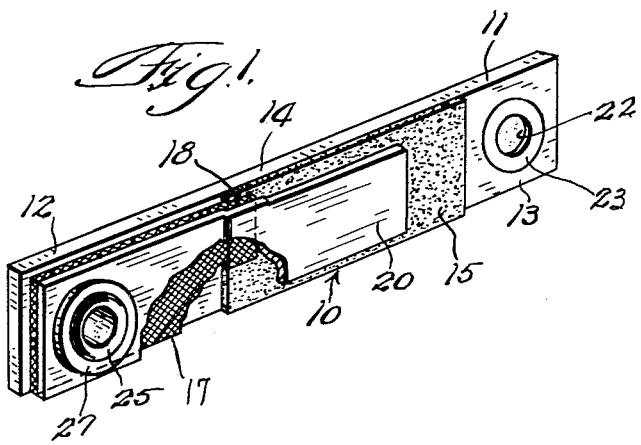
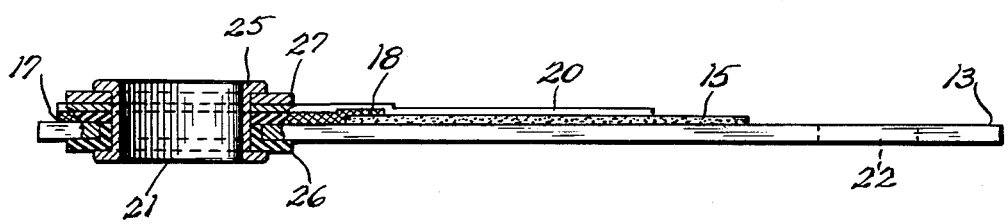
INVENTORS.
Rudolph J. Cepon &
Elsie M. Johnson.
By Schneider & Dressler. Attys.

United States Patent Office
2,716,207
Patented Aug. 23, 1955

2,716,207
ELECTRICAL APPARATUS

Rudolph J. Cepon, North Chicago, and Elsie M. Johnson, Waukegan, Ill., assignors to Fansteel Metallurgical Corporation, a corporation of New York Application October 6, 1951, Serial No. 250,088

2 Claims. (Cl. 317—234)

This invention relates to an electrical apparatus and more particularly to a dry type of barrier layer device such as a selenium rectifier. As is well known, such devices generally have a carrier electrode of some suitable metal, upon which is disposed a barrier layer material, such as selenium, in the case of a selenium rectifier. The barrier layer material is suitably treated after which a counterelectrode is provided. Such a counterelectrode is usually made of a metal or alloy having a relatively low melting point. The counterelectrode is applied in such a manner that uniform and satisfactory contact with the barrier layer is provided throughout the device, and the complete assembly is electroformed in accordance with conventional procedures to develop asymmetrical conducting characteristics in the barrier layer.

In order to provide terminals for connecting the barrier layer device in a circuit, it is necessary to provide good contact with both the carrier and counterelectrodes. In many instances, the means for obtaining such contact involves the application of pressure to a part of the device. Thus for example, in certain instances, it is necessary to use rigid flat metal washers to press upon the counter electrode surface for providing suitable contact thereto. Barrier layer devices of the prior art have been so constructed that pressure upon any part of the counter electrode is communicated to at least part of the barrier layer material.

Pressure of the counterelectrode upon the barrier layer material has an undesirable and substantial effect upon the operating characteristics of the barrier layer device. In the case of a selenium rectifier, pressure upon part or all of the barrier layer material increases reverse current and impairs the efficiency of the rectifier.

In accordance with this invention, a construction is provided whereby the terminals portions of the barrier layer device are insensitive to pressure and have no tendency to communicate any undesirable operating characteristics to the rectifier as a whole, because of pressure condition.

One exemplary embodiment of the invention will now be explained in connection with the drawings; wherein:

Figure 1 is a perspective with certain parts broken away of a construction of a rectifier embodying the present invention;

Figure 2 is an elevation of the structure shown in Figure 1 with part of the various layers being shown in section.

Referring now to the drawings, the rectifier generally indicated by numeral 10 includes carrier electrode 11 having end terminal portions 12 and 13 and intermediate portion 14. Carrier electrode 11 may be of any suitable metal, such as iron, nickel or nickel-plated iron or any other suitable conducting material. In accordance with usual practice, one face of the carrier electrode is suitably prepared to receive barrier layer 15 of selenium. This barrier layer material may be applied to the carrier electrode surface in any one of a number of well-known ways.

Barrier layer 15 may extend substantially the full width of carrier electrode 10 but covers only intermediate portion 14 thereof. Thus terminal portions 12 and 13 of the carrier electrode are free of barrier layer 15. Disposed over carrier electrode terminal portion 12 is layer 17 of insulating material. Such insulating material may be a paint, lacquer, rubber composition, or any other material which may be painted, sprayed or coated upon terminal portion 12 of the carrier electrode. The insulating layer may also be a layer of paper or a preformed layer of other dielectric material. It is generally preferred to have overlap 18 of the insulating material extend beyond the adjacent edge of barrier layer 15. This overlap may be above or below the edge of barrier layer 15 and should be as small as possible. It is provided as a precautionary measure against the possibility of any voids or cracks between what would normally be the opposed edges of insulation and barrier material. Disposed over insulating layer 17 and barrier layer 15 is counter electrode 20. This electrode is usually of some low melting metal or alloy such as a bismuth-cadmium alloy, and is generally applied so that the counter electrode material melts and solidifies against the barrier layer material.

Carrier electrode 11 has terminal portion 12 suitably apertured at 21 and has terminal portion 13 suitably apertured at 22, surrounded by an annular cleaned area 23. Insulating layer 17 and counterelectrode material 20 are also apertured to register with apertured portion 21 of the carrier electrode. Passing through the assembled electrode and insulating structure is metal eyelet 25. Eyelet 25 is insulated from carrier electrode 11 by insulating washer 26 of fiber or any other suitable material. Washer 27 of brass or any other desired metal may be provided above counterelectrode 20. Washer 27 is thick enough so that the overall thickness of the entire device at the rivet is greater than at any other part of the device. The region of overlap is preferably beyond the washer.

Instead of an eyelet, a bolt and nut arrangement may be used. However, an eyelet is preferred since a number of rectifiers may be bolted together to form a stack.

Since the maximum thickness of the rectifier will be at terminal portion 12 and since this terminal portion is free of barrier layer material, variations in compression at this region will have no effect upon rectifier operation. It is clear that the other terminal portion 13 may be subjected to pressure without in any way affecting the characteristics or operation of the rectifier, this portion consisting entirely of carrier electrode material and being capable of withstanding large variations in pressure.

While the rectifier stack is shown as having a generally rectangular shape, other shapes are possible. It is also possible to eliminate the over lap of insulating material 17, in which case it will be necessary to prevent or eliminate short circuits across the barrier layer at the junction of the barrier and insulating layers. It is understood that the thickness of each of the various layers is greatly exaggerated and no attempt has been made to show proper relative porportions.

What is claimed is:

1. A dry plate type of rectifier of the type having an asymmetrically conducting barrier layer disposed between carrier and counterelectrodes and where said asymmetrically conducting barrier layer is pressure sensitive, a carrier electrode having end terminal portions and and an intermediate electrode portion, a layer of insulating material disposed on one face of said carrier electrode at one terminal portion, a layer of asymmetrically conducting material disposed on said one face of carrier electrode at said intermediate portion thereof and out of contact with said terminal portions of said carrier electrode, and a counterelectrode disposed above said insulating layer and asymmetrically conducting layer, the other terminal portion of said carrier electrode being free of all material and being apertured to render the same available as a terminal for said carrier electrode, the carrier electrode and insulating layer and counterelectrode material being apertured at said one terminal portion and terminal means insulated from said carrier electrode passing through the registering apertures at said one terminal portion for providing a connection to said counterelectrode, whereby said terminal portions being free of asymmetrically conducting material are capable of withstanding substantial pressure without affecting the operating characteristics of said device.

2. The rectifier according to claim 1, wherein said layer of insulating material overlaps the asymmetrically conducting material, said insulating material covering the marginal portion of the asymmetrically conducting material and being sealed thereto so that counterelectrode material cannot pass to the carrier electrode material.

References Cited in the file of this patent

UNITED STATES PATENTS

| | | |
|---|---|---|
| 1,801,836 | Aumann | Apr. 21, 1931 |
| 2,172,200 | Hein | Sept. 5, 1939 |
| 2,182,377 | Guanella | Dec. 5, 1939 |
| 2,213,388 | Dormoy et al. | Sept. 3, 1940 |
| 2,221,616 | Smith | Nov. 12, 1940 |
| 2,314,104 | Richards et al. | Mar. 16, 1943 |
| 2,414,471 | Kotterman | Jan. 21, 1947 |
| 2,444,430 | Denmark | July 6, 1948 |
| 2,445,769 | Fiore | July 27, 1948 |
| 2,482,799 | Richards et al. | Sept. 27, 1949 |
| 2,498,890 | Kotterman | Feb. 28, 1950 |
| 2,517,602 | Richards et al. | Aug. 8, 1950 |